US011163339B2

(12) United States Patent
Lin et al.

(10) Patent No.: US 11,163,339 B2
(45) Date of Patent: Nov. 2, 2021

(54) FOLDABLE ELECTRONIC DEVICE

(71) Applicants: Che-Hsien Lin, Taipei (TW); Che-Hsien Chu, Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/197,391

(22) Filed: Nov. 21, 2018

(65) Prior Publication Data
US 2019/0163240 A1     May 30, 2019

Related U.S. Application Data

(60) Provisional application No. 62/592,369, filed on Nov. 29, 2017.

(51) Int. Cl.
    *G06F 1/16*     (2006.01)
    *E05D 3/12*     (2006.01)
    *E05D 11/00*    (2006.01)

(52) U.S. Cl.
    CPC .......... *G06F 1/1681* (2013.01); *G06F 1/1618* (2013.01); *E05D 3/122* (2013.01); *E05D 11/0054* (2013.01); *E05Y 2900/606* (2013.01)

(58) Field of Classification Search
    CPC . G06F 1/1681; G06F 1/1618; E05D 11/0054; E05D 3/122; E05Y 2900/606
    See application file for complete search history.

(56) References Cited

U.S. PATENT DOCUMENTS 5,325,984 A * 7/1994 Ady ............... B65D 43/165
                                              220/817
5,666,694 A * 9/1997 Slow ............. G06F 1/1618
                                              16/308

(Continued)

FOREIGN PATENT DOCUMENTS

CN      202597443      12/2012
TW      M430142        5/2012

(Continued)

OTHER PUBLICATIONS

"Office Action of Taiwan Counterpart Application," dated Sep. 20, 2019, p. 1-p. 7.

*Primary Examiner* — Adrian S Wilson
*Assistant Examiner* — Theron S Milliser
(74) *Attorney, Agent, or Firm* — JCIPRNET

(57) ABSTRACT

A foldable electronic device including a first body, a second body, and a dual-shaft hinge module is provided. The second body has a first reference plane and a second reference plane opposite to each other. The dual-shaft hinge module has a first shaft and a second shaft that are connected to the first body and the second body respectively. The second shaft is a cam shaft. A cam portion of the cam shaft abuts between a pair of stop portions of the second body. The first body rotates relative to the second body through the dual-shaft hinge module. When the first body is switched from a state of overlapping the first reference plane to a state of overlapping the second reference plane, the cam portion pushes the stop portions to drive the second body away from the first body.

15 Claims, 17 Drawing Sheets

(56) References Cited

U.S. PATENT DOCUMENTS

| | | | | |
|---|---|---|---|---|
| 5,715,575 A * | 2/1998 | Kubota | .............. | H04M 1/0216 16/342 |
| 7,936,559 B2 * | 5/2011 | Chen | .................... | G06F 1/1662 16/303 |
| 7,954,203 B2 * | 6/2011 | Chen | .................... | G06F 1/1681 16/239 |
| 7,971,321 B2 * | 7/2011 | Chen | .................. | H04M 1/0212 16/367 |
| 8,011,065 B2 * | 9/2011 | Chen | ...................... | G06F 1/162 16/242 |
| 8,405,978 B2 * | 3/2013 | Okutsu | ................ | G06F 1/1616 16/326 |
| 9,189,032 B2 * | 11/2015 | Jheng | .................. | G06F 1/1681 |
| 9,500,013 B2 * | 11/2016 | Senatori | .................... | E05D 3/12 |
| 9,624,703 B1 * | 4/2017 | Lin | ........................... | E05D 3/12 |
| 9,921,613 B2 * | 3/2018 | Kuramochi | ........... | G06F 1/1618 |
| 2003/0112589 A1 * | 6/2003 | Shimano | ................ | G06F 1/162 361/679.09 |
| 2006/0238968 A1 * | 10/2006 | Maatta | ............... | H04M 1/0218 361/679.01 |
| 2007/0151381 A1 * | 7/2007 | Pelkonen | ............. | G06F 1/1616 74/437 |
| 2008/0263827 A1 * | 10/2008 | Hsu | ...................... | G06F 1/1616 16/362 |
| 2010/0142131 A1 * | 6/2010 | Tang | ..................... | G06F 1/1616 361/679.01 |
| 2010/0154165 A1 * | 6/2010 | Chen | ...................... | G06F 1/162 16/239 |
| 2010/0154167 A1 * | 6/2010 | Chen | ...................... | G06F 1/162 16/250 |
| 2011/0047751 A1 * | 3/2011 | Chen | .................... | G06F 1/1681 16/303 |
| 2011/0053651 A1 * | 3/2011 | Miyashita | ............. | G06F 1/1616 455/566 |
| 2011/0205695 A1 * | 8/2011 | Hassemer | ............ | G06F 1/1681 361/679.01 |
| 2012/0162951 A1 * | 6/2012 | Hamada | ................ | G06F 1/1635 361/807 |
| 2013/0016492 A1 * | 1/2013 | Wang | ........................ | E05D 3/18 361/820 |
| 2013/0135809 A1 * | 5/2013 | Uchiyama | ............. | G06F 1/1681 361/679.09 |
| 2013/0170124 A1 * | 7/2013 | Pan | ...................... | H05K 5/0226 361/679.08 |
| 2013/0249360 A1 * | 9/2013 | Guo | ........................ | G06F 1/166 312/223.2 |
| 2013/0318746 A1 * | 12/2013 | Kuramochi | ........... | G06F 1/1681 16/342 |
| 2014/0338483 A1 * | 11/2014 | Hsu | ........................ | F16H 21/44 74/96 |
| 2015/0227175 A1 * | 8/2015 | Motosugi | ............. | G06F 1/1681 16/341 |
| 2016/0070310 A1 * | 3/2016 | Holung | ................. | G06F 1/1683 361/679.09 |
| 2016/0083988 A1 * | 3/2016 | Hsu | ....................... | G06F 1/1681 361/679.01 |
| 2016/0153222 A1 * | 6/2016 | Hu | ........................ | G06F 1/1681 361/679.55 |
| 2016/0326786 A1 * | 11/2016 | Lee | ........................ | G06F 1/1681 |
| 2018/0230724 A1 * | 8/2018 | Lin | ........................... | E05D 11/06 |

FOREIGN PATENT DOCUMENTS

| | | |
|---|---|---|
| TW | M469724 | 1/2014 |
| TW | 201532500 | 8/2015 |
| TW | M539213 | 4/2017 |
| TW | M540458 | 4/2017 |

* cited by examiner

FOLDABLE ELECTRONIC DEVICE

CROSS-REFERENCE TO RELATED APPLICATION

This application claims the priority benefit of U.S. provisional application Ser. No. 62/592,369, filed on Nov. 29, 2017. The entirety of the above-mentioned patent application is hereby incorporated by reference herein and made a part of this specification.

BACKGROUND OF THE INVENTION

Technical Field

The disclosure relates to an electronic device and, more particularly, to a foldable electronic device.

Description of Related Art

A foldable electronic device that is convenient for users to carry around is produced to supply the users with sufficient functionality and portability. A laptop computer, for example, can further improve the portability while providing the required functions, and thus can replace the desktop computer. In general, the laptop computer includes a first body having a display screen, a second body having a system, and a hinge module for connecting the first body to the second body, and the user can rotate the body by the hinge module to develop different usage statuses.

With advancement of the hinge module, the above bodies have been able to reach a usage status of a fully-unfolded flat plate, that is, the first body can be shifted from one side of the second body (opening angle is regarded as 0 degree) to the other side of the second body (opening angle is regarded as 360 degrees), so that the laptop computer can also be in the same usage mode as a tablet computer. However, in order to smoothly achieve the above opening angle of 360 degrees, it is necessary to cut a part of the body to allow the space required for rotation of the hinge module, or directly allow the hinge module to protrude from the body, yet a decent appearance of the laptop would be affected in any way. By contrast, on the premise that the decent appearance of the laptop computer is maintained, the body without avoidance space as described above is likely to interfere with the hinge module, and cannot achieve a complete opening angle (of 360 degrees).

SUMMARY OF THE INVENTION

The disclosure provides a foldable electronic device capable of driving bodies to move away from or closer to each other by a cam shaft of a dual-shaft hinge module.

The foldable electronic device of the disclosure includes a first body, a second body, and a dual-shaft hinge module. The second body has a first reference plane and a second reference plane opposite to each other. The dual-shaft hinge module has a first shaft and a second shaft that are connected to the first body and the second body respectively, wherein the second shaft is a cam shaft, and a cam portion of the cam shaft abuts between a pair of stop portions of the second body. The first shaft rotates relative to the second body through the dual-shaft hinge module to be unfolded or folded. When the first body is switched from a state of overlapping the first reference plane to a state of overlapping the second reference plane, the cam portion pushes the stop portions to drive the second body away from the first body.

In view of the above, one shaft of the dual-shaft hinge module of the foldable electronic device is a cam shaft, and the cam shaft is limited to and stopped between the stop portions of the body. Thus, when the first body rotates relative to the second body through the dual-shaft hinge module, with rotation of the cam shaft, a vertical gap between the bodies may be adjusted. In other words, when the bodies of the foldable electronic device are folded and converted (from one plane of the body to another plane), the corresponding driving relationship between the cam shaft and the stop portion will eventually achieve the adjustment of the body spacing, when the spacing of the body is increased, structural interference can be avoided in the rotation of the dual-shaft hinge module, and the gap between the bodies can also be provided to accommodate other components.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
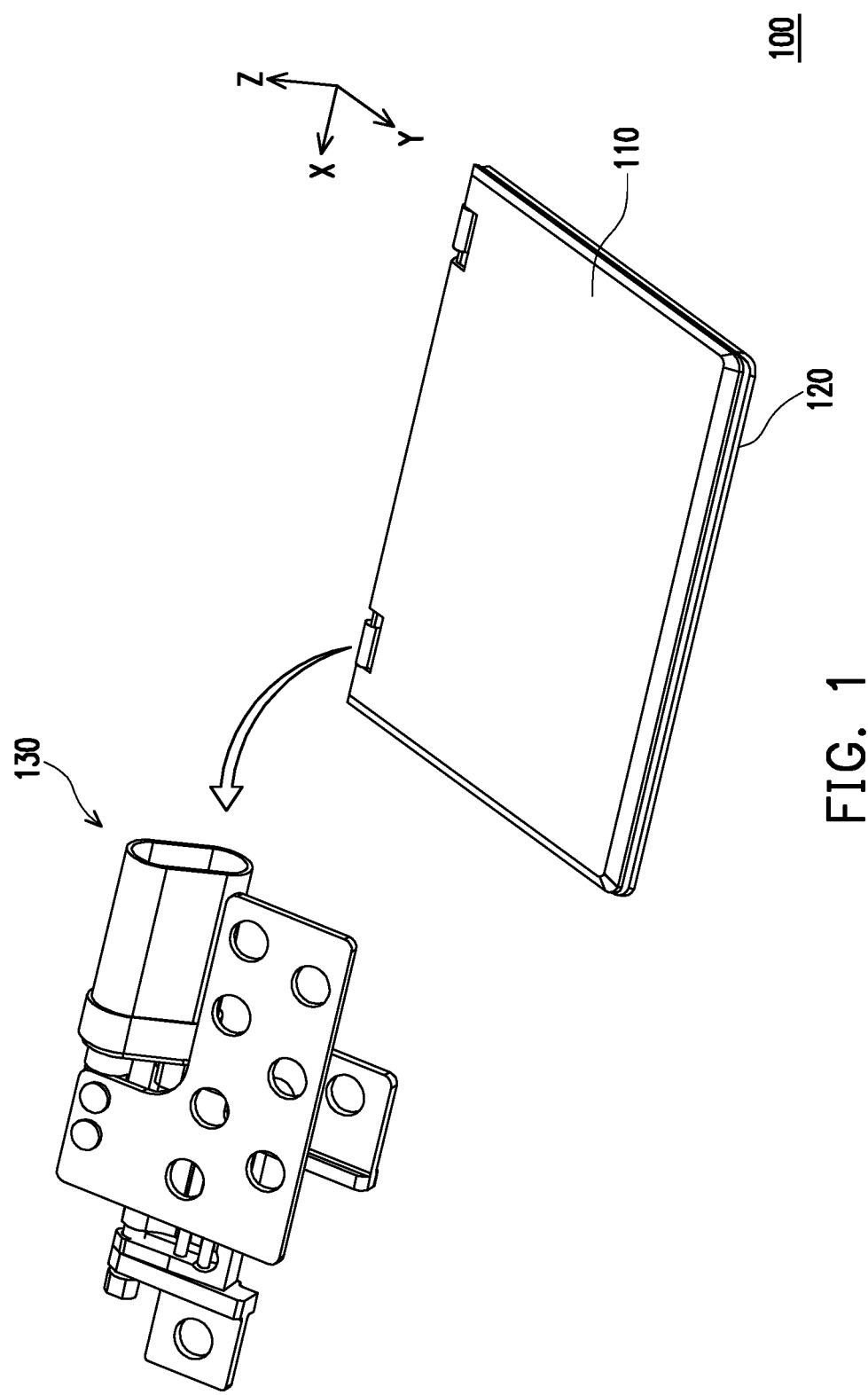
FIG. 1 schematically illustrates a foldable electronic device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 schematically illustrates a foldable electronic device according to an embodiment of the disclosure. The Cartesian coordinate system is also provided to facilitate descriptions about members. Referring to FIG. 1, in the present embodiment, a foldable electronic device 100, such as a laptop computer, includes a first body 110, a second body 120, and a dual-shaft hinge module 130, and the dual-shaft hinge module 130 is connected between the first body 110 and the second body 120 to allow the first body 110 to rotate relative to the second body 120 through the dual-shaft hinge module 130. As shown in FIG. 1, the foldable electronic device 100 is provided with the dual-shaft hinge modules 130 at both sides of the body, but since the left-side and right-side dual-shaft hinge modules 130 are the same, one of the dual-shaft hinge modules will be taken as an example for descriptive purposes below.

Figure 2A:
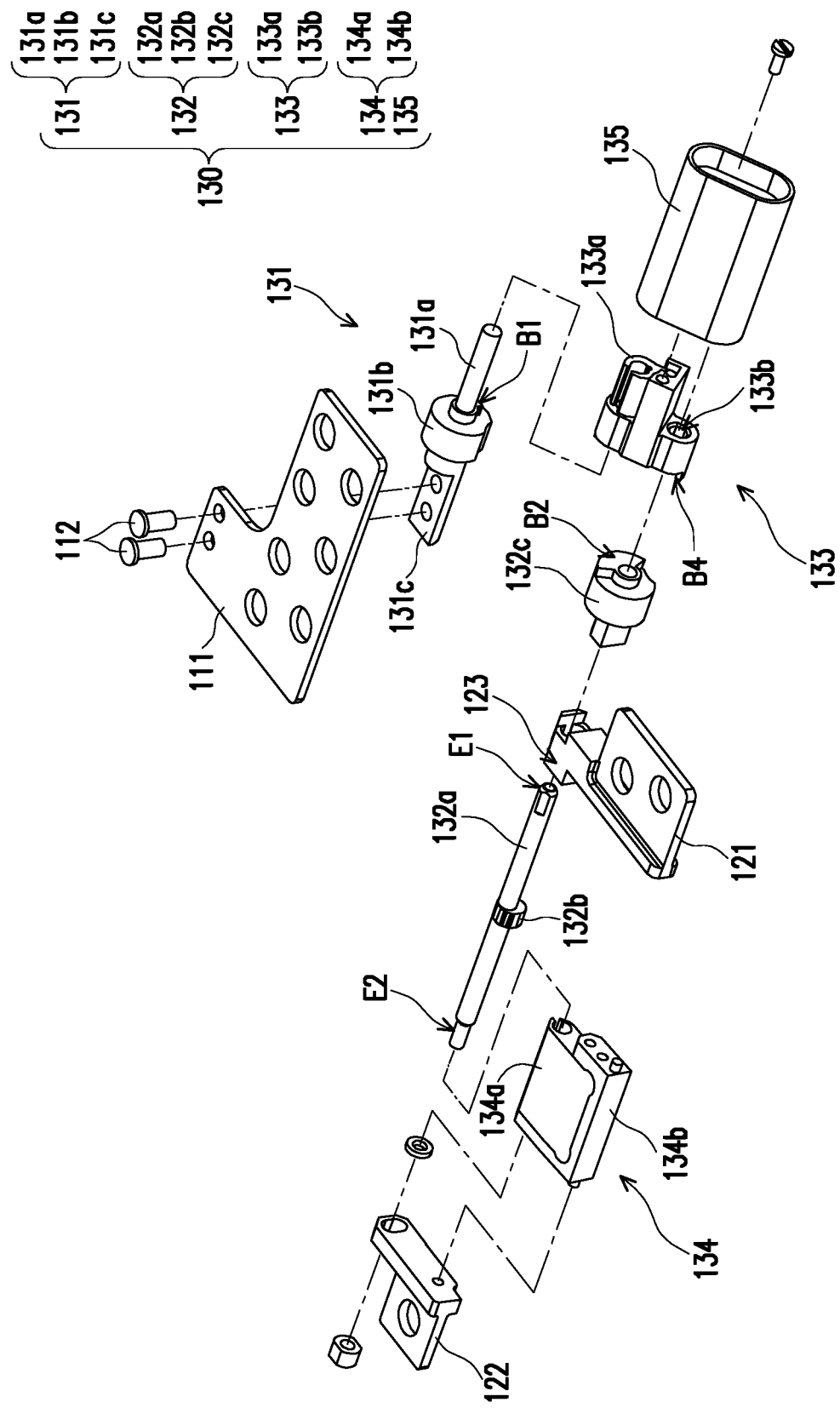
FIGS. 2A and 2B illustrate the dual-shaft hinge module of FIG. 1 from different perspectives, respectively.
Figure 2B:
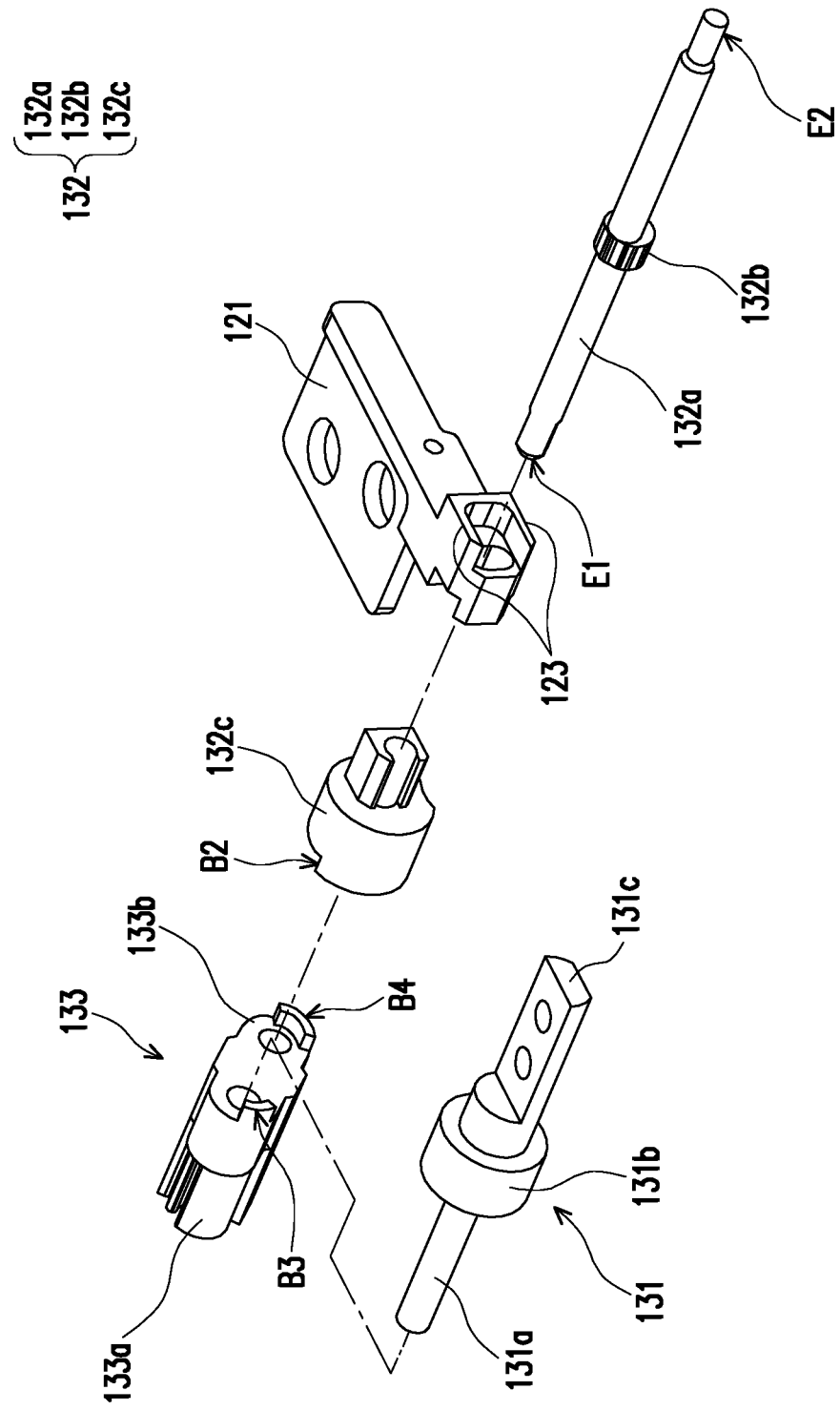
Figure 2C:
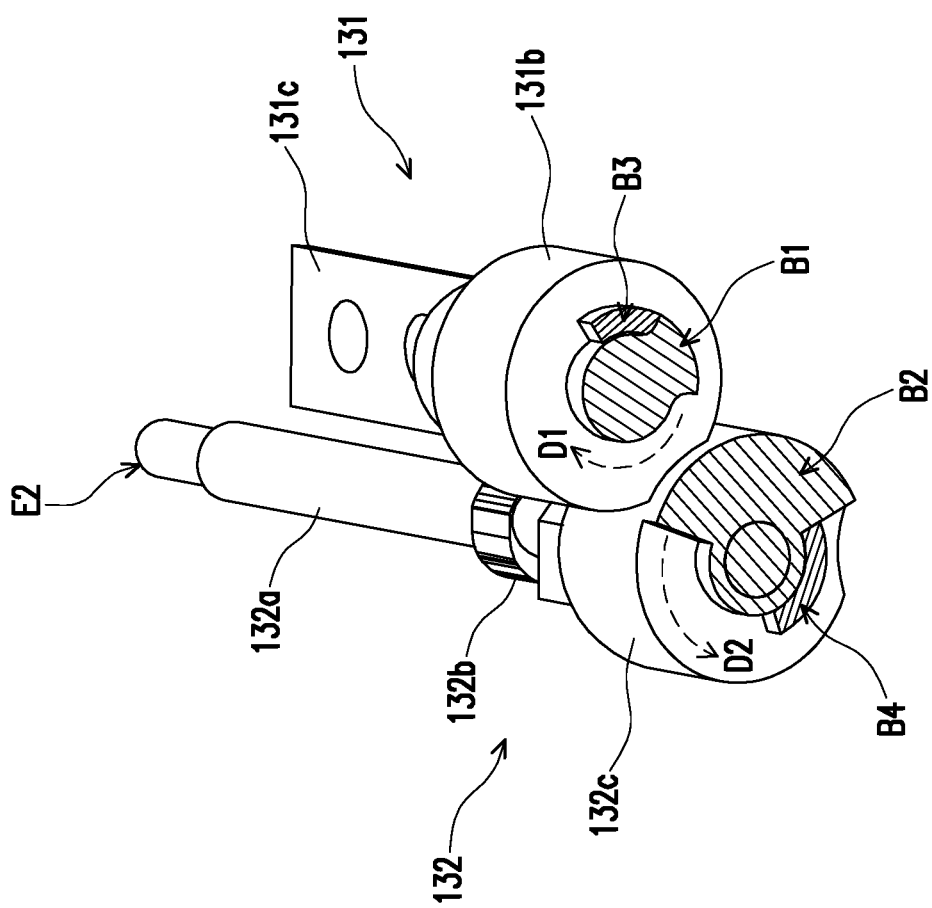
FIG. 2C is a cross-sectional view showing a portion of the dual-shaft hinge module.

FIGS. 2A and 2B illustrate the dual-shaft hinge module of FIG. 1 from different perspectives, respectively. FIG. 2C is a cross-sectional view showing a portion of the dual-shaft hinge module. Referring to FIGS. 2A to FIG. 2C simultaneously, in the present embodiment, the dual-shaft hinge module 130 includes a first shaft 131, a second shaft 132, an actuating member 133 and a casing 135, and the first shaft 131 is fixed to a bracket 111 of the first body 110 by a fixing member 112 (e.g., a rivet). As shown in FIG. 2A, a fixing portion 131c of the first shaft 131 is screwed on the bracket 111 by the fixing member 112. At the same time, a shaft portion 131a of the first shaft 131 penetrates and passes through a first torque providing portion 133a, and the shaft portion 131a is clamped by the first torque providing portion 133a of the actuating member 133. Accordingly, when the first shaft 131 rotates, the friction between the first torque providing portion 133a and the first shaft 131 can serve as the torque of the dual-shaft hinge module 130 to support the body of the foldable electronic device 100. Herein, the first torque providing portion 133a may be an integrated structure, or be made of a plurality of friction pieces stacked together.

Furthermore, a second end E2 of the second shaft 132 penetrates and passes through brackets 122 and 134 and is clamped to a second torque providing portion 134a of the bracket 134. Similarly, the second torque providing portion 134a generates friction as a source of torque when the second shaft 132 rotates. Herein, a body 134b of the bracket 134 is assembled to be clamped between a bracket 121 and the bracket 122 to increase structural strength of the bracket 134. In addition, a first end E1 of the second shaft 132 penetrates and passes through the bracket 121 and a position-limiting opening 133b of the actuating member 133 to allow the actuating member 133 and the second shaft 132 to rotate at the same time. The second shaft 132 also has a second driving wheel 132c disposed at the first end E1 and located between the actuating member 133 and the bracket 121. Correspondingly, the first shaft 131 further has a first driving wheel 131b located between the shaft portion 131a and the fixing portion 131c, and a surface of the first driving wheel 131b abuts against a surface of the second driving wheel 132c. Accordingly, the first driving wheel 131b and the second driving wheel 132c can be driven by each other to rotate.

Referring to FIG. 2C, as well as FIGS. 2A and 2B, in the present embodiment, the first shaft 131 has a first position-limiting portion B1 disposed at a side of the first driving wheel 131b, the second shaft 132 has a second position-limiting portion B2 disposed at a side of the second driving wheel 132c, the actuating member 133 has a third position-limiting portion B3 and a fourth position-limiting portion B4, and when the actuating member 133, the first shaft 131 and the second shaft 132 are combined with each other, the third position-limiting portion B3 is in a movement path of the first position-limiting portion B1 and vice versa, the fourth position-limiting portion B4 is in a movement path of the second position-limiting portion B2 and vice versa. Thus, a corresponding rotation pattern can be generated according to the corresponding relationship above. For example, when the first shaft 131 rotates in a direction D1, the second shaft 132 is driven to rotate in a direction D2, and at the same time, according to the corresponding relationship of the position-limiting portions B1 to B4, the first body 110 and the second body 120 can have different rotation modes.

Figure 3:
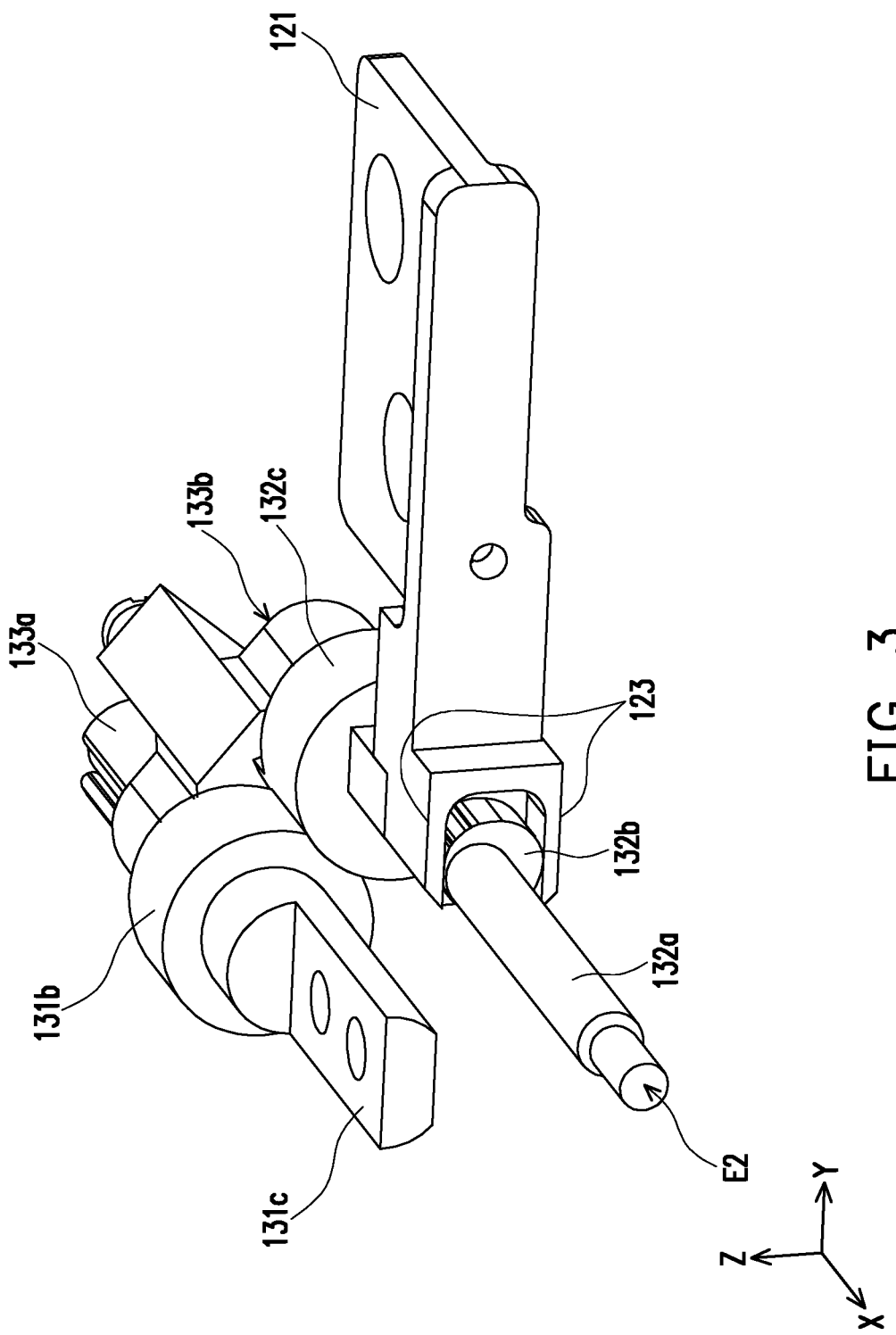
FIG. 3 schematically illustrates a portion of members of the dual-shaft hinge module from another perspective.

FIG. 3 schematically illustrates a portion of members of the dual-shaft hinge module from another perspective. Referring to FIGS. 2A, 2B and 3 at the same time, it is worth noting that in the present embodiment, the second shaft 132 of the dual-shaft hinge module 130 is a cam shaft having a cam portion 132b disposed on a shaft portion 132a, and when the shaft portion 132a penetrates the bracket 121, the cam portion 132b abuts between a pair of stop portions 123 located on the bracket 121 without gaps. It can be seen that when the second shaft 132 rotates, the cam portion 132b drives the stop portions 123 to move along a Z-axis. Detailed descriptions will follow later.

Figure 4A:
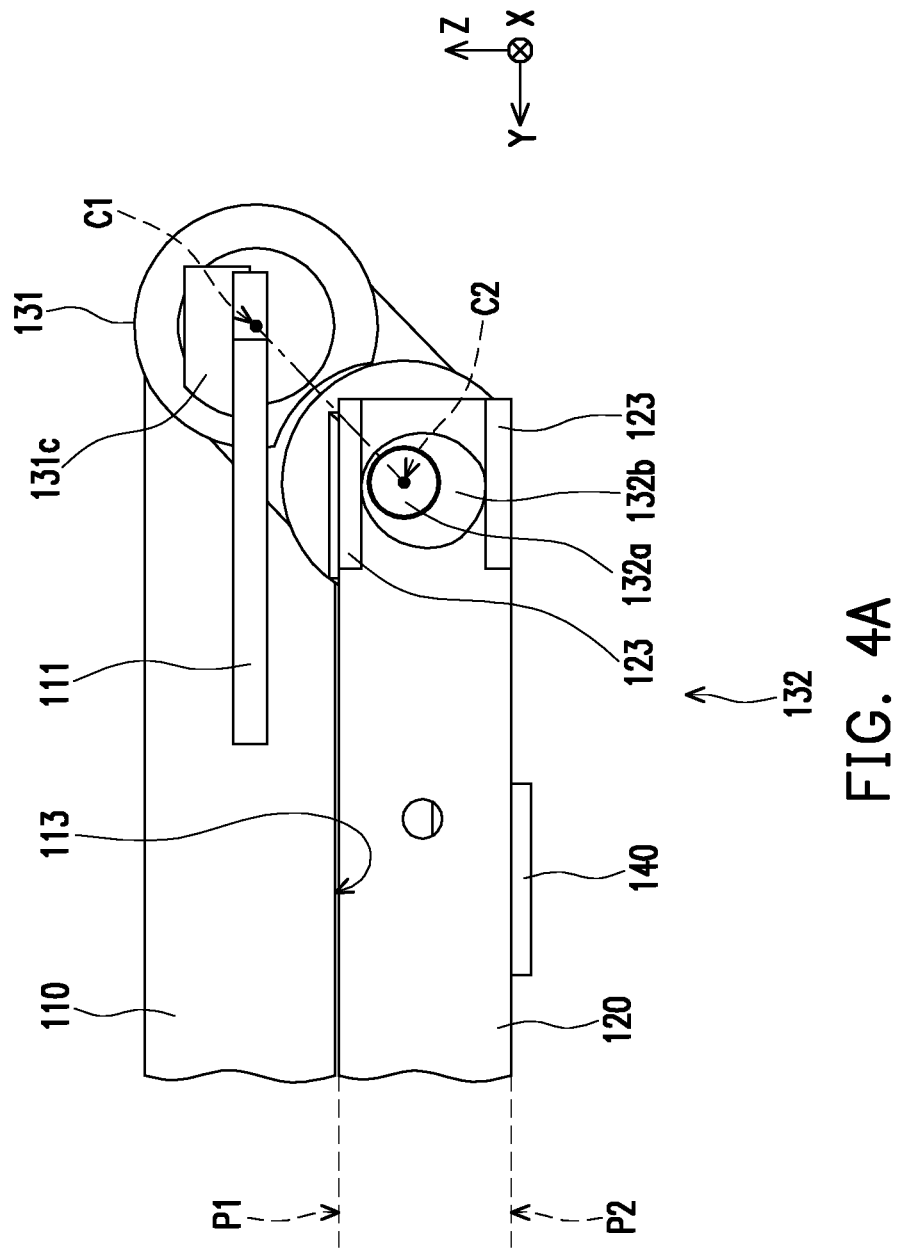
FIGS. 4A to 4D schematically illustrate changes in a cam shaft of the foldable electronic device.

FIGS. 4A to 4D illustrate changes in the cam shaft of the foldable electronic device. In the simple drawing, action features of the cam shaft 132 are recognizable, and the remaining relevant members can be seen in the above drawings. First, as shown in FIG. 4A, the first body 110 has a display screen 113, and the second body 120 has a first reference plane P1 and a second reference plane P2 opposite to each other. The first reference plane P1 can be regarded as a surface of a laptop computer on which a keyboard and a touch pad are disposed. The state refers to a state in which the foldable electronic device 100 is completely closed (folded), that is, the first body 110 overlaps the first reference plane P1. At this time, the first body 110 and the second body 120 (the first reference plane P1) are actually in a state of structural contact without gaps. At the same time, the connection between an axis C1 of the first shaft 131 and an axis C2 of the second shaft 132 (a connection line of the first shaft 131 and the second shaft 132) is inclined with respect to the first reference plane P1 or the second reference plane P2. Accordingly, the foldable electronic device 100 has a small size along the Z axis and has a slim appearance.

Figure 4B:
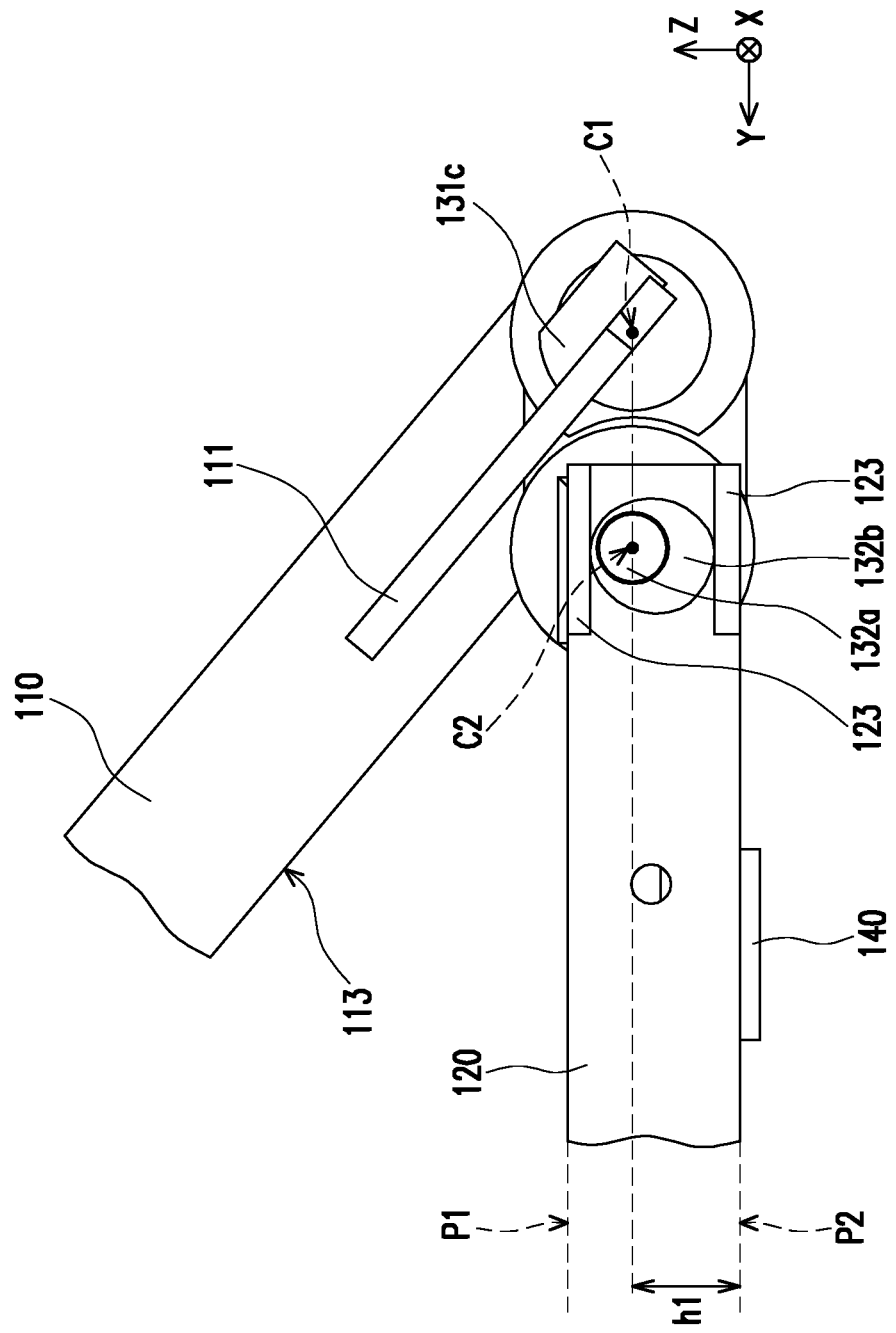
Figure 4C:
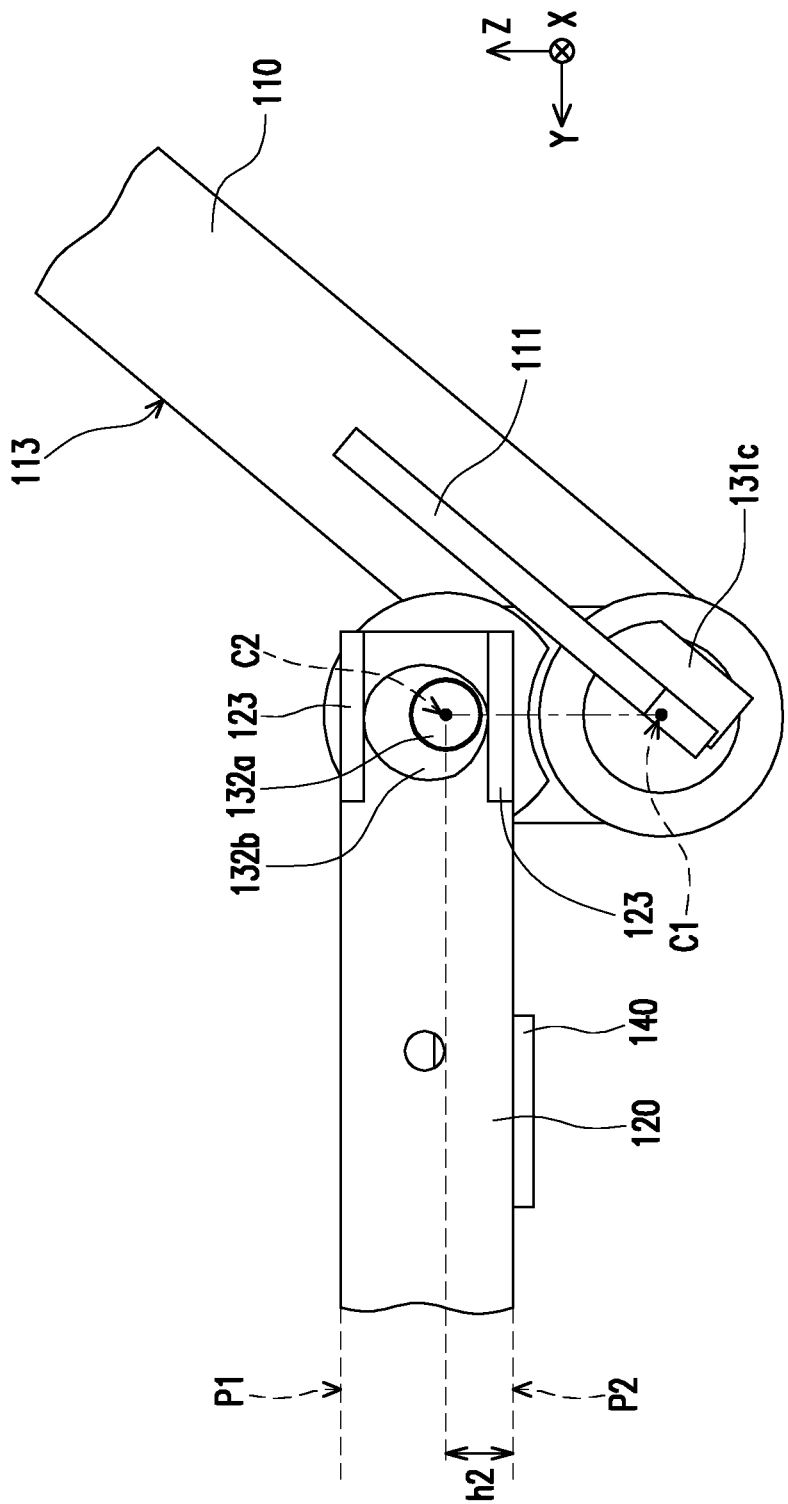

Next, referring to FIG. 4B and FIG. 4C at the same time, the first body 110 rotates with respect to the second body 120 by the first shaft 131 of the dual-shaft hinge module 130 to be unfolded until the first body 110 being in the state of FIG. 4C. At this time, it is apparent that since an interaction of the cam portion 132b of the second shaft 132 and the stop portion 123 of the second body 120, the shaft portion 132a of the second shaft 132 gradually moves downward along the Z-axis. At this time, taking the second reference plane P2 as a reference, the shaft portion 132a drops from a height h1 to a height h2 with respect to the second reference plane P2. If the foldable electronic device 100 is placed on a platform or desktop (not shown), the first body 110 lifts up the second body 120, and a part of the first body 110 moves away from the platform or desktop.

Figure 4D:
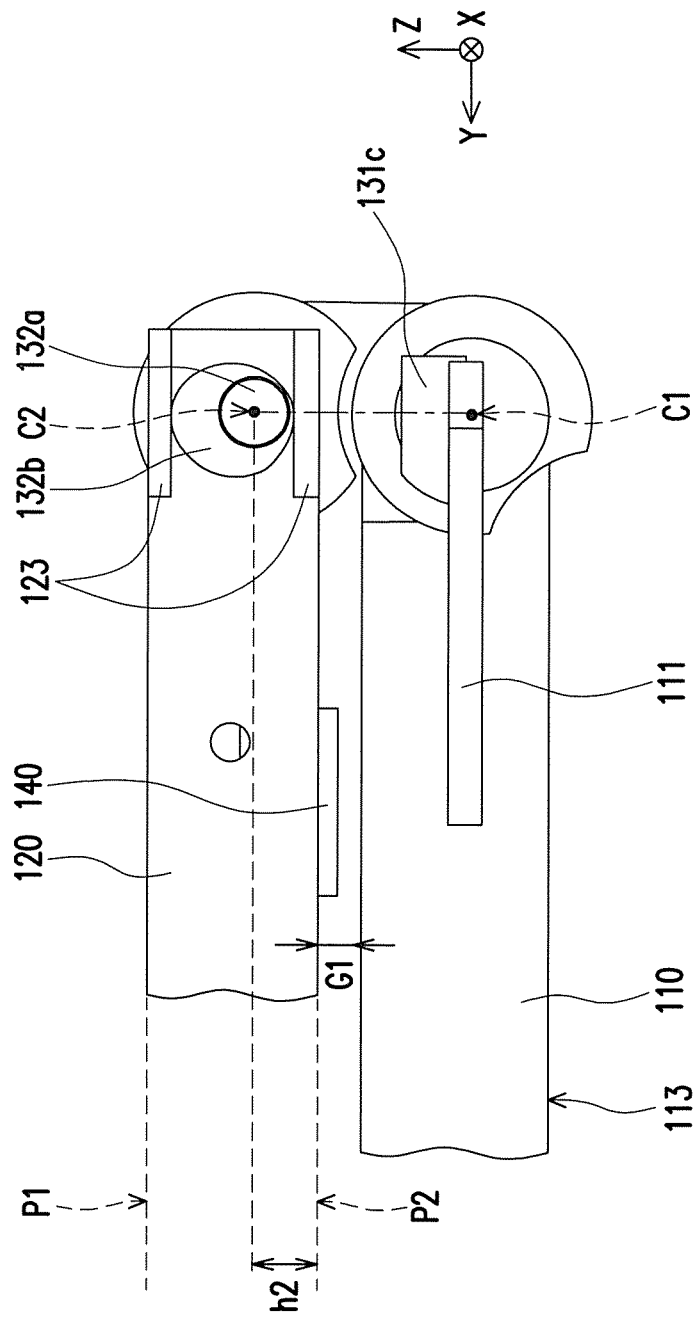

Ultimately, referring to FIG. 4D, the first body 110 continues to rotate relative to the second body 120 until the first body 110 overlaps the second reference plane P2 of the second body 120. As described above, since the shaft portion 132a of the second shaft 132 has dropped along the Z-axis, a gap G1 is formed between the second reference plane P2 and the first body 110. At this time, the display screen 113 of the first body 110 faces away from the second reference plane P2. In other words, by a driving mode of the cam shaft of the dual-shaft hinge module 130, the first body 110 and the second body 120 can move away from each other along the Z-axis by rotating to be unfolded. By contrast, when the first body 110 rotates relative to the second body 120 through the dual-shaft hinge module 130 to be folded, that is, the first body 110 sequentially restores from the position in FIG. 4D to the position in FIG. 4A, the first body 110 and the second body 120 approach to each other along the Z-axis. It should also be noted that the disclosure does not limit a contour of the cam shaft, that is, a designer can adjust the contour correspondingly, depending on the design of appearance, structural configuration and usage requirements of the foldable electronic device to control displacement between the bodies during the rotation.

On the other hand, since the gap G1 is formed between the first body 110 and the second reference plane P2, the foldable electronic device 100 of the present embodiment further comprises a foot pad 140 which is disposed on the second reference plane P2, and thus can be accommodated in the gap G1. By contrast, if a cam shaft structure of the dual-shaft hinge module 130 is not available, when the first body 110 rotates to be unfolded, the dual-shaft hinge module 130 interferes with the second body 120 and the first body 110 is not fully unfolded due to the foot pad 140 (i.e. the first body 110 is parallel to the second reference plane P2) at the same time. Herein, the gap between the pair of stop portions 123 is equal to an addition of the shifting distance of the second shaft 132 (i.e. the above difference between the height h1 and the height h2, h1-h2) and a shaft diameter of the second shaft 132.

Figure 4E:
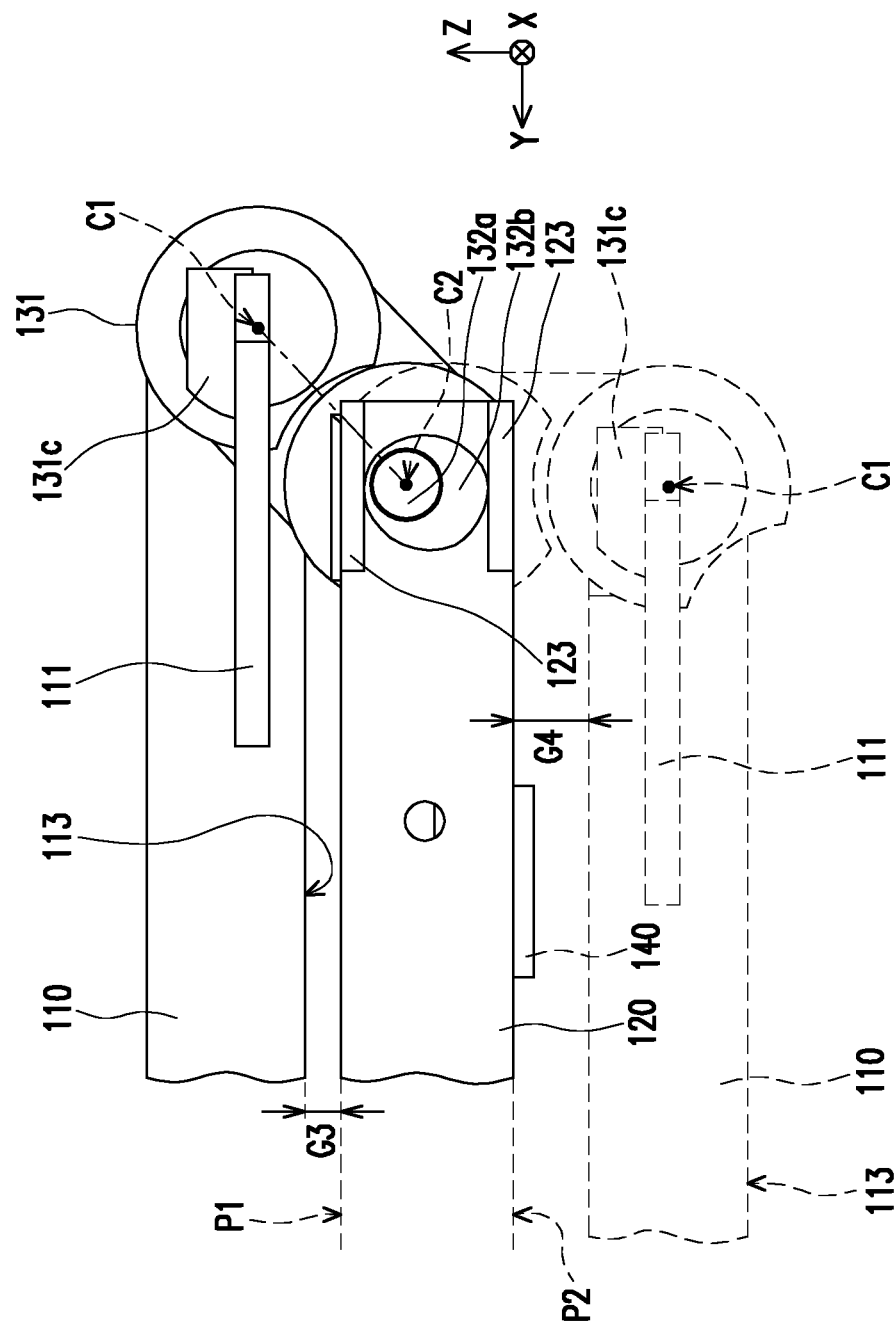
FIG. 4E schematically illustrates changes in a foldable electronic device according to another embodiment of the disclosure.

FIG. 4E schematically illustrates changes in a foldable electronic device according to another embodiment of the disclosure. Referring to FIG. 4E, as well as FIGS. 4A and 4D of the above embodiment, in the present embodiment, the first body 110 illustrated in solid lines is still folded on the first reference plane P1 of the second body 120 with a gap G3 maintained between the first body 110 and the second body 120. The first body 110 illustrated in broken lines overturns with respect to the second body 120 and is folded on the second reference plane P2, a gap G4 is maintained between the first body 110 and the second reference plane P2 of the second body 120, wherein the gap G4 is greater than the gap G3. In other words, in terms of the same dual-shaft hinge module 130 as in the previous embodiment, for first body 110 and the second body 120, during the process of rotating from 0 degree (the first body 110 illustrated in solid lines) to 360 degrees (the first body 110 illustrated in broken lines), the first body 110 has the tendency to move away from the second body 120 along the Z-axis. The difference between the present embodiment and the previous embodiment is that when the first body 110 is folded on the first reference plane P1, the gap G3 already exists between first body 110 and the second body 120.

Figure 5A:
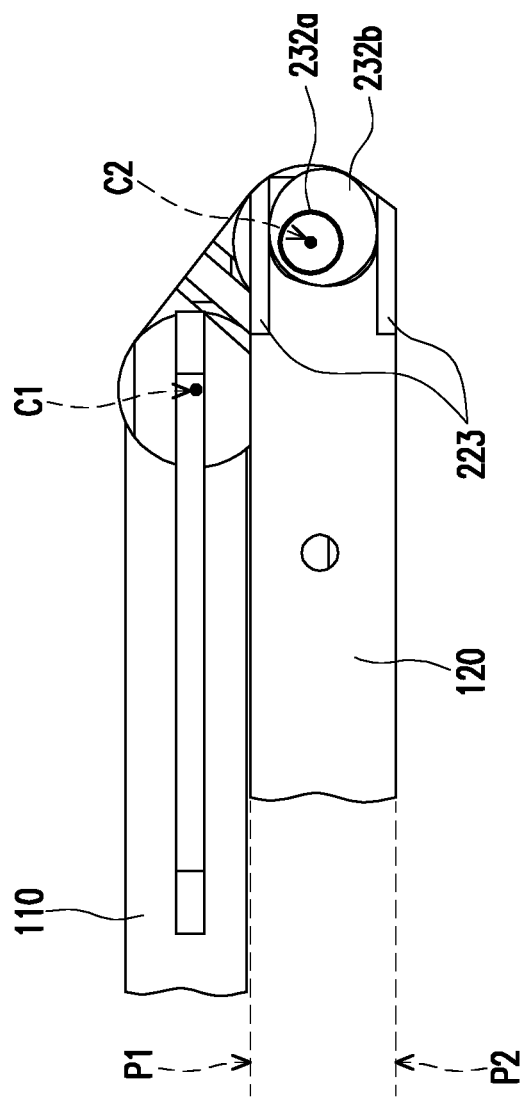
FIGS. 5A to 5D schematically illustrate changes in a cam shaft according to another embodiment.
Figure 5B:
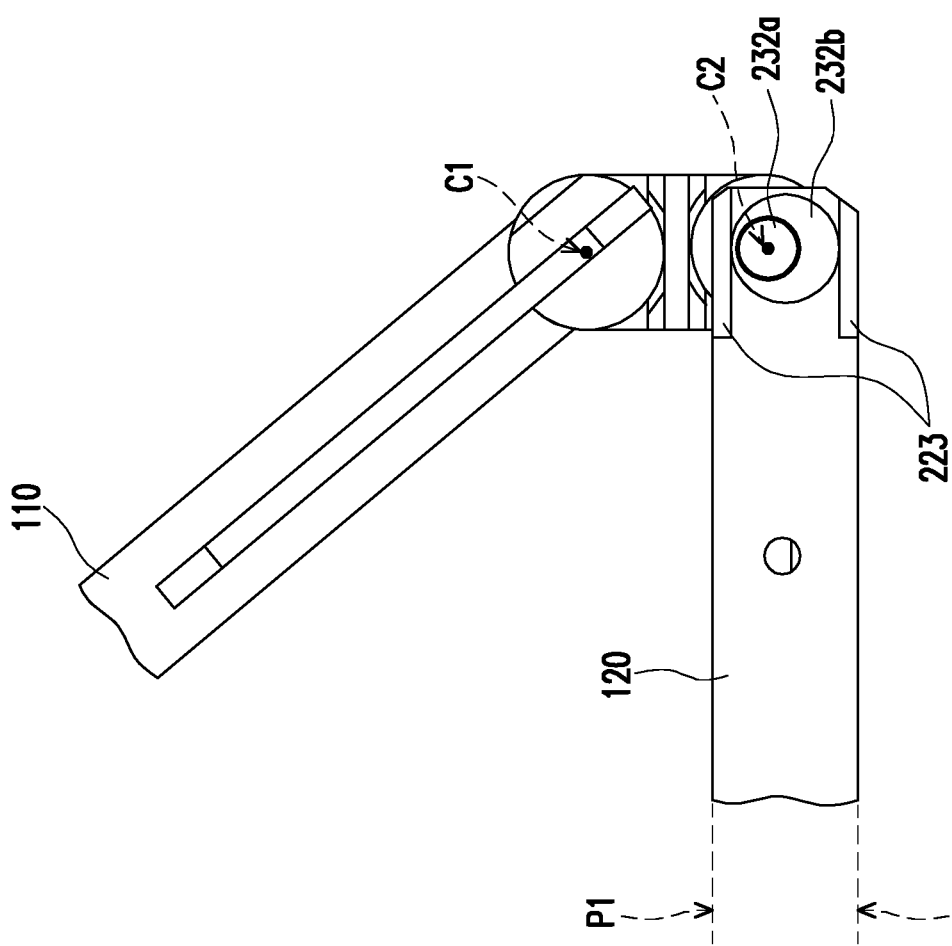
Figure 5C:
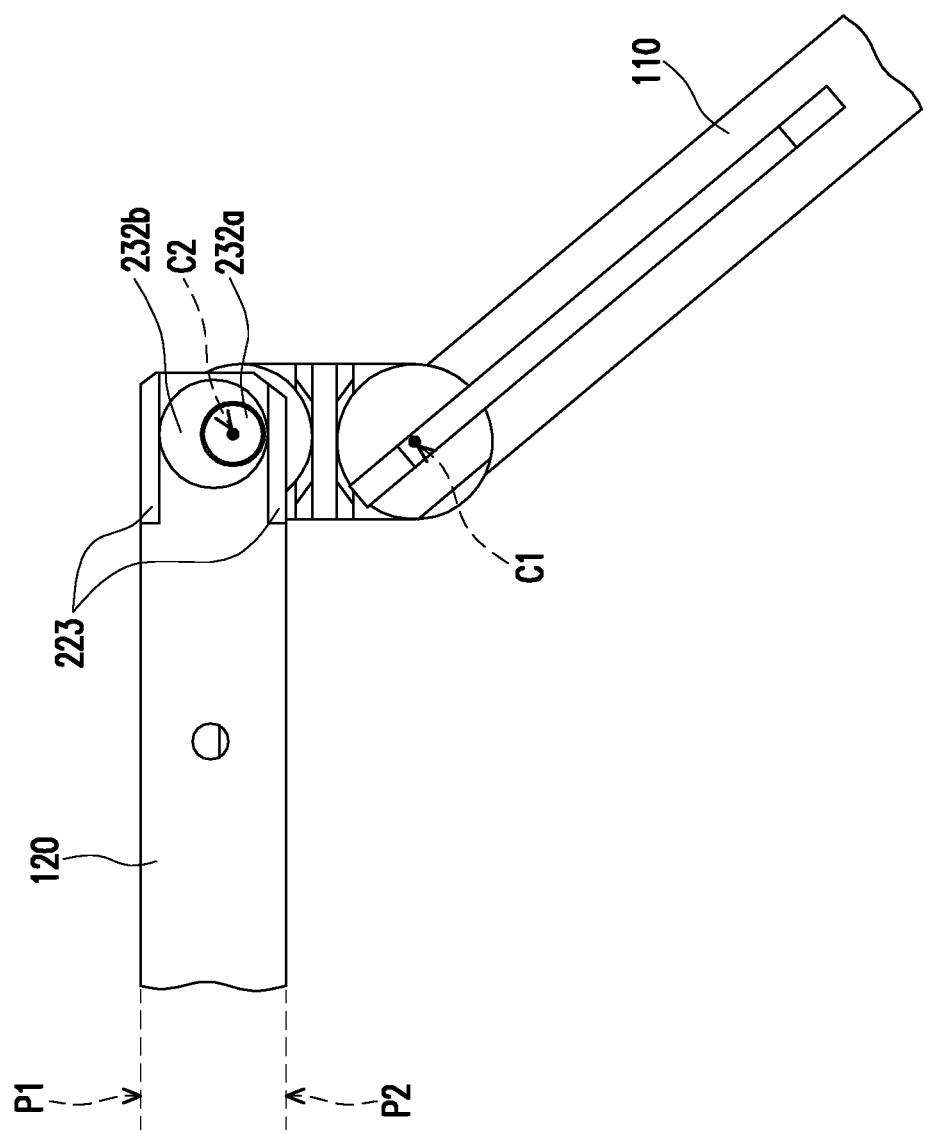
Figure 5D:
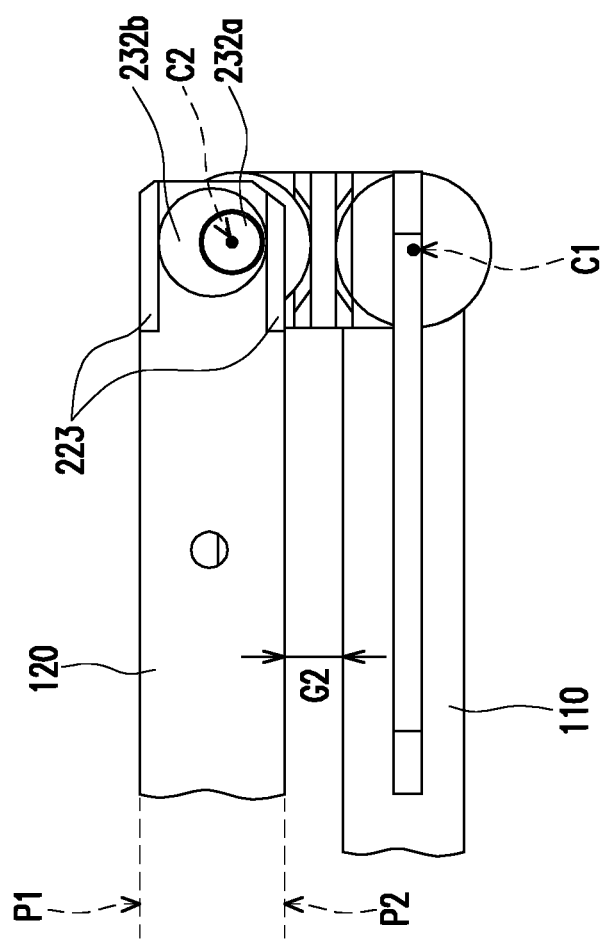

FIGS. 5A to 5D schematically illustrate changes in a cam shaft according to another embodiment. The difference from the previous embodiment is that the cam shaft of the present embodiment includes a cam portion 232b provided on a shaft portion 232a, and the cam portion 232b has a circular contour that is eccentrically disposed with respect to the shaft portion 232a of the second shaft. However, the configuration does not affect driving effects of the cam shaft. FIGS. 5B and 5C clearly show that when the second shaft rotates, the cam portion 232b also drives a stop portion 223 to allow the shaft portion 232a to drop along the Z-axis, and finally, the gap G2 is formed between the first body 110 and the second reference plane P2 in FIG. 5D. In addition, the driving effect means a tendency of the body to move away from or close to another body when rotating with respective to another, but in fact, the corresponding relationship between rotation angle and displacement can be appropriately adjusted depending on design requirements so as to generate the same or different displacement during the rotation.

Figure 6A:
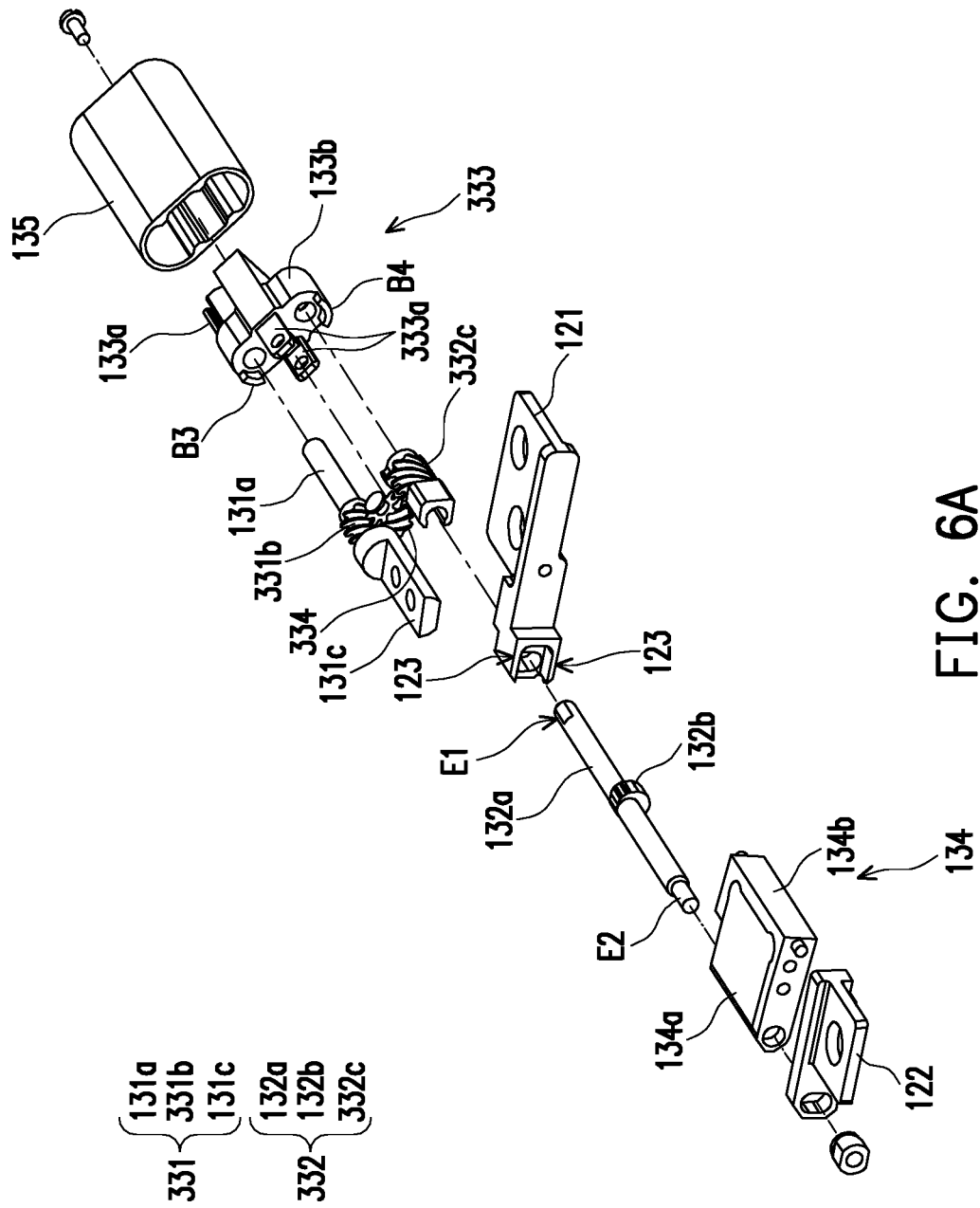
FIGS. 6A and 6B are exploded views of a dual-shaft hinge module according to another embodiment.
Figure 6B:
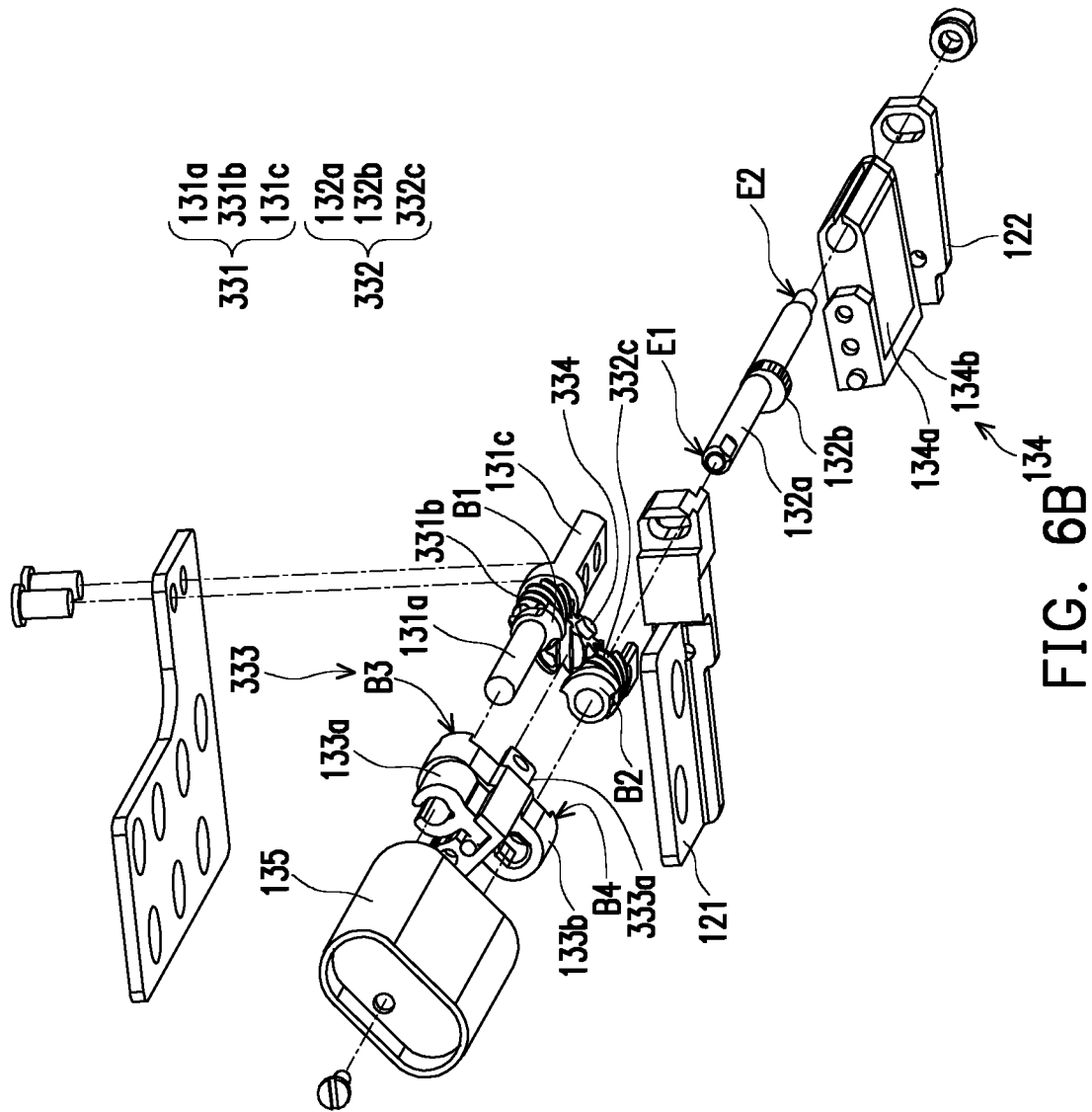

FIGS. 6A and 6B are exploded views of a dual-shaft hinge module according to another embodiment. Referring to FIGS. 6A and 6B at the same time, the difference from the previous embodiment is that a first driving wheel 331b of a first shaft 331 is a helical gear and is also disposed between the shaft portion 131a and the fixing portion 131c, and a second driving wheel 332c of a second shaft 332 is a helical gear and is also disposed at the second end E2. Furthermore, the dual-shaft hinge module further comprises a transmitting member 334, which is also a helical gear and is disposed at a clamping portion 333a of a actuating member 333 and is coupled between the first driving wheel 331b and the second driving wheel 332c to transfer the rotation of one of the first driving wheel 331b and the second driving wheel 332c to the other by the transmitting member 334. No limit is put on the form of the driving wheel, and in other embodiments not shown, the above helical gear can also substitute for a circular gear mechanism to achieve a transmission effect of a fixed transmission ratio, or substitute for a non-circular gear mechanism to achieve an effect of a changeable transmission ratio. Alternatively, all the current elements capable of transmission, such as a spur gear, a bevel gear, a bearing gear, a worm, etc., is applicable to the disclosure.

Figure 7:
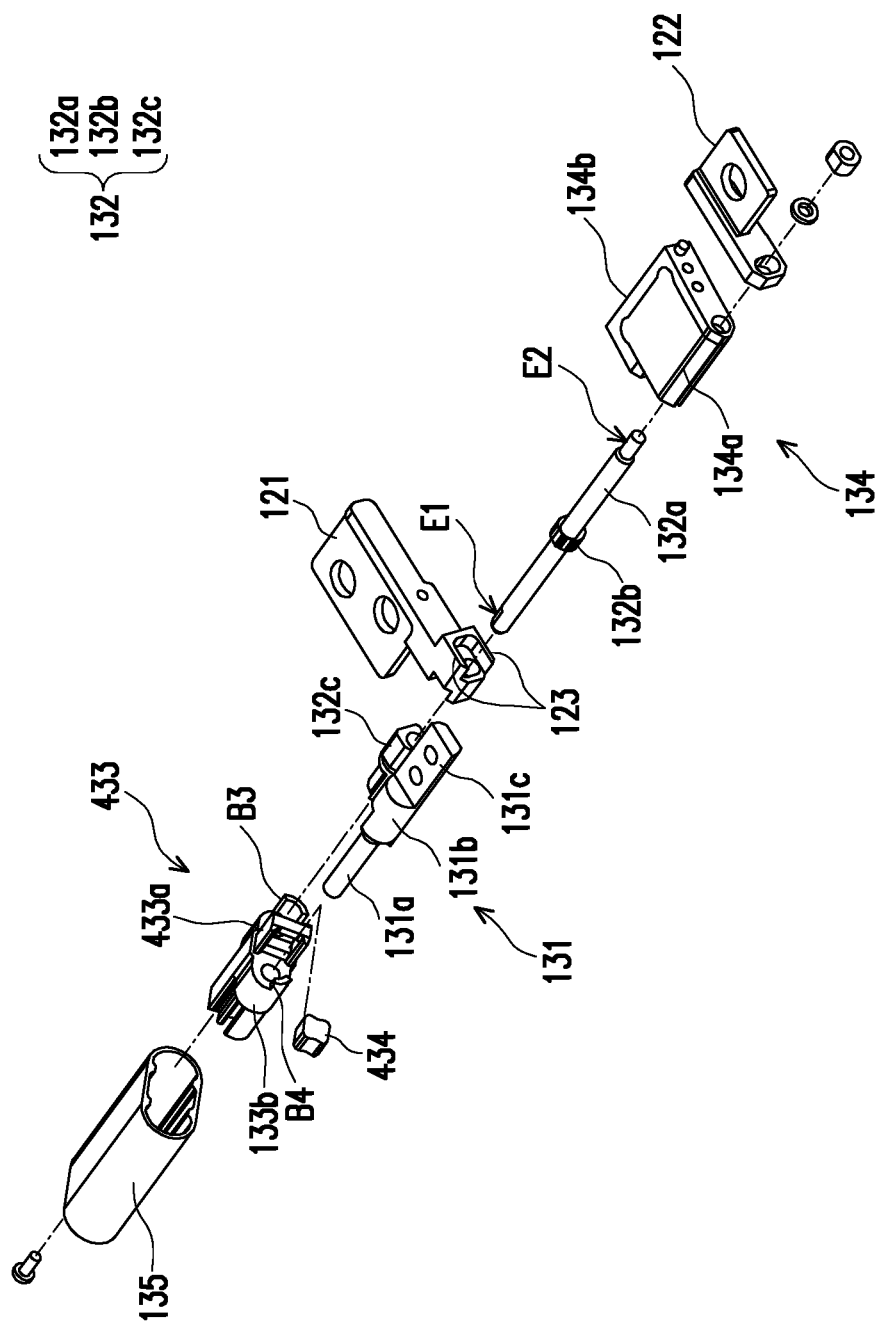
FIG. 7 is an exploded view of a dual-shaft hinge module according to another embodiment.

FIG. 7 is an exploded view of a dual-shaft hinge module according to still another embodiment. Referring to FIG. 7, as well as the embodiments in FIGS. 6A and 6B at the same time, the first shaft 131 and the second shaft 132 of the present embodiment are as shown in FIGS. 2A to 2C, but the difference is that the dual-shaft hinge module of the present embodiment further comprises a transmitting member 434 that slidably penetrates a receiving frame 433a of an actuating member 433 and slidably abuts between the first driving wheel 131b and the second driving wheel 132c to achieve the needed specific actuating effect through relative rotation by the first shaft 131 and the second shaft 132.

In summary of the above, in the above embodiments of the disclosure, one of the shafts of the dual-shaft hinge module is a cam shaft, and the foldable electronic device allows the cam shaft to be limited to and stopped between the stop portions of the body. Thus, when the first body rotates relative to the second body through the dual-shaft hinge module, with rotation of the cam shaft, the difference in height between the dual-shaft hinge module and the body can be adjusted. Further, a designer can correspondingly design the cam shaft according to the desired gap to allow the gap between the pair of stop portions to become equal to the addition of the shifting distance of the second shaft and the shaft diameter of the second shaft. At the same time, the contour of the cam portion of the second shaft can also be adjusted accordingly. In other words, regardless of the driving mode of the dual-shaft hinge module, under the above structural configuration of the cam shaft, the gap of the body can vary with a state of the body, and at the same time, the case that the foldable electronic device cannot have a decent appearance due to the need to avoid interference is also prevented.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A foldable electronic device, comprising:
   a first body;

a second body having a first reference plane and a second reference plane opposite to each other; and a dual-shaft hinge module, having a first shaft and a second shaft connected to the first body and the second body respectively, wherein the second shaft is a cam shaft, a cam portion of the cam shaft abuts between a pair of stop portions of the second body, the first body rotates relative to the second body through the dual-shaft hinge module to be folded or unfolded, and when the first body is switched from a state of overlapping the first reference plane to a state of overlapping the second reference plane, the cam portion has a circular contour being eccentric with respect to the second shaft, and pushes the pair of stop portions to move along a direction perpendicular to the first reference plane to drive the second body away from the first body, the pair of stop portions are parallel to the first reference plane and to each other, a wall is in between and in physical contact with the pair of stop portions, and the pair of the stop portions and the wall forms an U-shape, and the pair of stop portions and the wall surround a recess for accommodating the cam portion, wherein during a process in which the first body rotates relative to the second body to be unfolded, the second shaft moves away from the first reference plane and approaches the second reference plane, and during a process in which the first body rotates relative to the second body to be folded, the second shaft moves away from the second reference plane and approaches the first reference plane.

2. The foldable electronic device of claim 1, wherein the first body has a display screen, when the first body overlaps the first reference plane, the display screen faces the first reference plane, and when the first body overlaps the second reference plane, the display screen faces away from the second reference plane.

3. The foldable electronic device of claim 2, further comprising a foot pad disposed on the second reference plane, wherein when the first body overlaps the second reference plane, the foot pad is accommodated between the first body and the second reference plane.

4. The foldable electronic device of claim 2, wherein when the first body overlaps the first reference plane, the first body is in contact with the first reference plane without gaps, and when the first body overlaps the second reference plane, a gap is formed between the first body and the second reference plane.

5. The foldable electronic device of claim 2, wherein when the first body overlaps the first reference plane, a first interval is maintained between the first body and the second body, when the first body overlaps the second reference plane, a second interval is maintained between the first body and the second reference plane, and the second interval is greater than the first interval.

6. The foldable electronic device of claim 1, wherein a movement axial direction of the second shaft is orthogonal to the first reference plane or the second reference plane.

7. The foldable electronic device of claim 1, wherein during a process in which the first body rotates relative to the second body to be folded or unfolded, a gap between the pair of stop portions is equal to an addition of a shifting distance of the second shaft and a shaft diameter of the second shaft.

8. The foldable electronic device of claim 1, wherein a connecting line of the first shaft and the second shaft is inclined with respect to the first reference plane or the second reference plane.

9. The foldable electronic device of claim 1, wherein the first shaft has a first position-limiting portion, the second shaft has a second position-limiting portion, the dual-shaft hinge module further comprises an actuating member on which a third position-limiting portion and a fourth position-limiting portion are disposed, wherein the third position-limiting portion is disposed in a movement path of the first position-limiting portion, and the fourth position-limiting portion is disposed in a movement paths of the second position-limiting portion.

10. The foldable electronic device of claim 9, wherein the first shaft further comprises a first driving wheel, and the second shaft further comprises a second driving wheel, the first driving wheel abutting against the second driving wheel to drive each other and rotate.

11. The foldable electronic device of claim 9, wherein the first shaft further comprises a first driving wheel, the second shaft further comprises a second driving wheel, and the dual-shaft hinge module further comprises a transmitting member movably coupled between the first driving wheel and the second driving wheel.

12. The foldable electronic device of claim 11, wherein the transmitting member slidably abuts between the first driving wheel and the second driving wheel.

13. The foldable electronic device of claim 11, wherein the first driving wheel, the second driving wheel and the transmitting member are helical gears respectively.

14. The foldable electronic device of claim 9, wherein the actuating member further comprises a first torque providing portion, the first shaft penetrates and passes through the first torque providing portion, and the first shaft is clamped by the first torque providing portion.

15. The foldable electronic device of claim 1, wherein the second body further comprises a bracket and a second torque providing portion, the pair of stop portions are located at the bracket, the second torque providing portion is disposed at the bracket, the second shaft penetrates and passes through the bracket and the second torsion providing portion, and the second shaft is clamped by the second torque providing portion.

* * * * *